(No Model.)

D. C. STILLSON.
Automatic Fire Valve.

No. 236,378. Patented Jan. 4, 1881.

WITNESSES
Helen M. Feegan
Frank G. Parker

INVENTOR
Daniel C. Stillson

UNITED STATES PATENT OFFICE.

DANIEL C. STILLSON, OF SOMERVILLE, MASSACHUSETTS.

AUTOMATIC FIRE-VALVE.

SPECIFICATION forming part of Letters Patent No. 236,378, dated January 4, 1881.

Application filed August 30, 1880. (No model.)

*To all whom it may concern:*

Be it known that I, DANIEL C. STILLSON, of Somerville, in the county of Middlesex and State of Massachusetts, have invented a new and useful Automatic Valve for Fire-Pipe, of which the following is a specification.

My invention relates to a valve let-off mechanism to be applied to a valve situated in a line of pipe or hose, said valve opening and allowing water or other fire-extinguishing fluid or gas to flow onto the fire, the opening being caused either by heat, an electric current, or by a pull-wire.

My invention consists in combining with the valve-stem a wedge which is inserted between the stem and a holding-buttress, said wedge being held in place by an arm attached to a rocker-shaft which is held by a pawl, a stiff spring or weighted lever serving to throw the rocker-shaft and its arm back, thus withdrawing the valve-holding wedge whenever the pawl is thrown out of place, which it may be by the action of a thermo-lever, by a current of electricity, or by a pull-wire.

Figure 1:
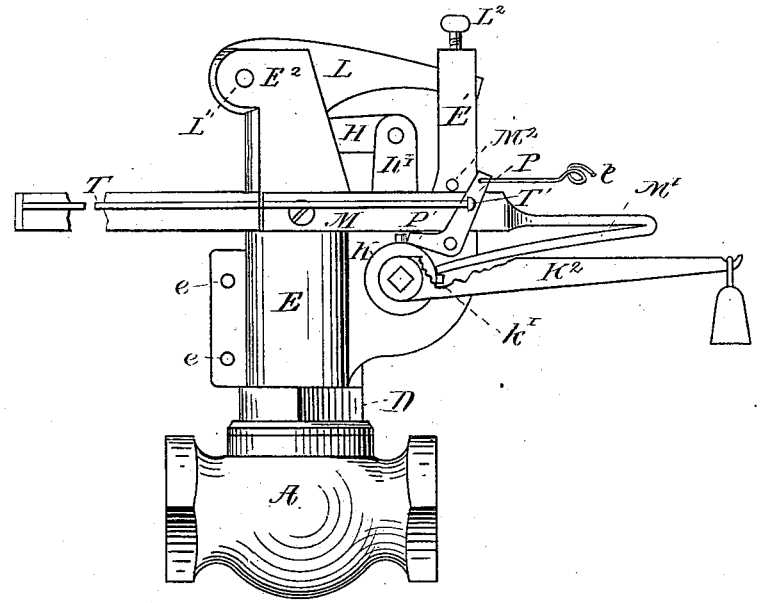
Figure 2:
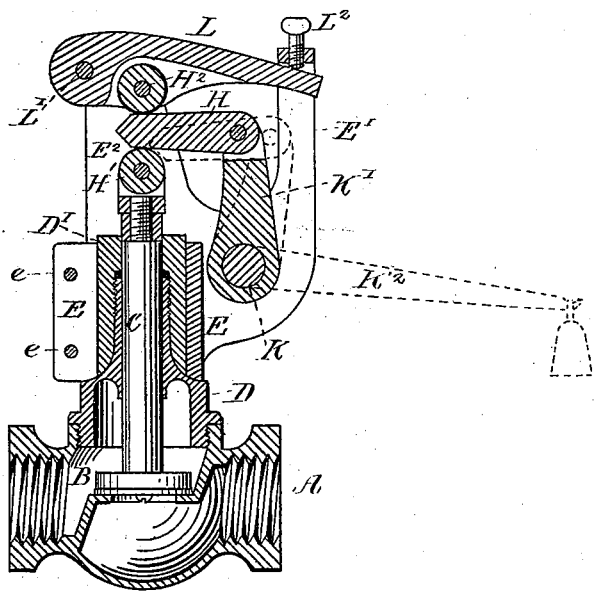

In the drawings, Figure 1 is an elevation of my invention. Fig. 2 is a vertical section of the same, the plane of the section being parallel to the plane of the elevation, Fig. 1.

My device can be applied to any ordinary valve. I have shown it as applied to a globe-valve, A, having a valve, B, and stem C, arranged in the usual manner. This is to be attached to any system of supply, either of water or other fire-extinguishing fluid or gas, and connected to a delivery-pipe, which may be provided with any desired distributing device which will be effective in extinguishing or preventing fire.

D is a packing-piece, screwed to the part A, and serves, in connection with the piece D', as packing and guide for the valve-stem C. (See Fig. 2.)

E E E' E² is a housing made fast to the part D' by clamping-screws $e$ $e$, and serves to hold the retaining and let-off device for governing the valve B, which it does through the medium of the valve-stem C. The valve is held onto its seat by the wedge H and the friction-wheels H' and H², these wheels being attached, respectively, to the valve-stem C and the lever L, the lever L being pivoted at one end to the housing-upright E², and held at its other end by the adjusting-screw L² in the housing-upright E'.

The wedge H is attached to the arm K' of the rocker-shaft K, and is held in place by it in the following manner: The shaft K has upon it a pin, $k$, Fig. 1, against which the end P' of the bent pawl P P' rests and locks it in place. Against the holding action of the pawl P P' a spring, M M', acts, the end of the spring resting on a pin, $k'$, the tendency of the spring being to throw the rocker-shaft K around, so as to draw the wedge H back, as indicated by dotted lines in Fig. 2. The weighted lever K² is attached to the rocker-shaft K, to assist in turning the shaft, and thus withdrawing the wedge H.

The operation of my invention is as follows: The valve is set down onto its seat, and the rocker-shaft K and its arm K' so turned as to force the wedge H to a position between the friction-wheels H' H². (See Fig. 2.) Then the whole is locked by the pawl P P', acting through the pin $k$, (see Fig. 1,) any desired amount of pressure on the valve B being obtained by the use of the adjusting-screw L². In case of fire the pawl P P' is thrown out of engagement with the pin $k$. This action allows the spring M M' and lever to act so as to withdraw the wedge H, and thus leave the valve B free to be opened by the pressure behind it, and sets the water to flowing to the desired place or places.

The unlocking movement of the pawl P P' may be effected automatically by the use of a thermo-bar, T, Fig. 1, or lever or spring, or by electrical action, or personally by the aid of a pull wire or chain.

The thermo expansion-bar T has one end fixed rigidly, while the other rests against a pin, T', on the pawl P P', and is adjusted to throw off the pawl when heated to a certain temperature.

What I claim is—

1. In a fire-valve device, the combination of the valve B, stem C, and lever L with the wedge H and an operating mechanism, all working together substantially as described, and for the purpose set forth.

2. In a fire-valve device, the combination of the valve B, stem C, and lever L with the wedge H, arm K', rocker-shaft K, spring M M', and pawl P P', all operating together substantially as described, and for the purpose set forth.

3. The combination of the rocker-shaft K, spring M M', and pawl P P' with the thermo expansion-bar T, substantially as described, and for the purpose set forth.

4. The combination of the rocker-shaft K, weighted lever K², and pawl P P' with the thermo expansion-bar T, substantially as described, and for the purpose set forth.

DANIEL C. STILLSON.

Witnesses:
HELEN M. FEEGAN,
FRANK G. PARKER.